(12) United States Patent
Teng

(10) Patent No.: US 8,714,201 B2
(45) Date of Patent: May 6, 2014

(54) WATER-SAVING DEVICE STRUCTURE

(75) Inventor: Po An Teng, Guangdong Province (CN)

(73) Assignee: Water Boger Hardware (Shenzhen) Co., Ltd., Guangdong (CN)

( * ) Notice: Subject to any disclaimer, the term of this patent is extended or adjusted under 35 U.S.C. 154(b) by 313 days.

(21) Appl. No.: 13/368,049

(22) Filed: Feb. 7, 2012

(65) Prior Publication Data

US 2013/0199626 A1 Aug. 8, 2013

(51) Int. Cl.
*F15D 1/04* (2006.01)
*F16K 15/14* (2006.01)

(52) U.S. Cl.
USPC .............. 138/45; 138/46; 137/504; 137/859; 137/513.3

(58) Field of Classification Search
USPC .................. 138/45, 44; 137/859, 513.3, 517, 137/512.15, 516.15, 119.01, 801
See application file for complete search history.

(56) References Cited

U.S. PATENT DOCUMENTS

| | | | | |
|---|---|---|---|---|
| 2,454,929 A | * | 11/1948 | Kempton | 138/45 |
| 2,960,109 A | * | 11/1960 | Wilson | 137/517 |
| 3,409,050 A | * | 11/1968 | Weese | 138/45 |
| 3,779,274 A | * | 12/1973 | Kelly | 137/505 |
| 4,883,093 A | * | 11/1989 | Miles et al. | 138/45 |
| 5,246,031 A | * | 9/1993 | Eichler et al. | 137/508 |
| 5,388,615 A | * | 2/1995 | Edlund et al. | 137/859 |
| 8,079,385 B2 | * | 12/2011 | Hatton | 137/859 |
| 8,590,555 B2 | * | 11/2013 | Wilson et al. | 137/1 |

* cited by examiner

*Primary Examiner* — Patrick F Brinson
(74) *Attorney, Agent, or Firm* — Ming Chow; Sinorica, LLC

(57) ABSTRACT

A water-saving device structure is provided. When the pressure of an entry water is high, a water-barrier sheet body is pressed to cause a downwardly-moved elastic stopping portion to block a water-inflow opening of a water-outflow seat body, so that the water flow is conducted to a water-outflow opening through a water-conducting opening of the water-barrier sheet body. When the pressure of the entry water is low, the entry water is conducted to the water-outflow opening via one path traveling from the water-conducting opening of the water-bather sheet body to the water-outflow opening of the water-outflow seat body and the other path traveling along the clearances of stopping wall portions of the water-outflow seat body, a water-storage circular slot portion, the water-inflow openings of the water-outflow seat body and the water-outflow opening of the water-outflow seat body. Therefore, the outflow water with steady flow rate can be obtained.

5 Claims, 8 Drawing Sheets

WATER-SAVING DEVICE STRUCTURE

BACKGROUND OF THE INVENTION

1. Field of the Invention

The present invention relates to an improved water-saving device structure, in particular relates to an improved water-saving device structure applied in a water-conservation device in the related technical field.

2. Description of the Related Art

In conventional water-saving devices, the main part of them lies in the structure of foaming head. The foaming head includes a water-guiding seat body utilized to be connectively disposed on a water-outflow opening of a faucet, a water-entry sheet body accommodated in the water-guiding seat body, and a net cover body accommodated in the water-guiding seat body (not shown in FIGs.). When the water-guiding seat body is connectively disposed on the water-outflow opening of the faucet, an outflow water from the faucet entering into the foaming head through the water-entry sheet body is mixed with air or bubbles blended by the net cover body, thereby increasing the flow rate of the bubbles in the water to reduce the volume of the outflow water per unit from the faucet and to slow down the flow rate of the outflow water for obtaining a water-saving effect. However, due to the inconsistent flow rate and pressure of the outflow water whenever the faucet is opened, the outflow water from the faucet cannot be effectively regulated by the water-entry sheet body and the net cover body disposed in the water-guiding seat body, and thus the outflow water from the foaming head is unstable. Moreover, because the faucet cannot regulate the flow rate of the outflow water at different water pressures, the flow rate of the outflow water from the faucet is not uniform and the time of the outflow water in use is extended, and thus the water-saving effect is not perfect.

BRIEF SUMMARY OF THE INVENTION

In view of this, the purpose of the present invent is to provide an improved water-saving device structure to increase the outflow water stability and the water-saving effect.

The improved water-saving device structure of the present invention comprises a water-outflow seat body, a water-barrier sheet body and a water-entry cover body. The water-outflow seat body comprises an outer seat circular wall portion, a water-outflow middle seat portion, a plurality of stopping wall portions disposed between the outer seat circular wall portion and the water-outflow middle seat portion, a water-storage circular slot portion disposed between the stopping wall portions and the water-outflow middle seat portion, a position-limiting clamping portion disposed inside the outer seat circular wall portion, a seat top surface disposed on top of the water-outflow middle seat portion, a plurality of water-inflow openings recessed on top of the seat top surface, and a water-outflow opening centrally penetrated through the water-outflow middle seat portion. The water-barrier sheet body, fixedly clamped in between the water-outflow middle seat portion and the stopping wall portions of the water-outflow seat body, comprises a centrally-disposed water-conducting opening corresponding to the water-outflow opening of the water-outflow seat body, an elastic stopping portion outwardly extended from a peripheral ring of the water-conducting opening, and a fixed ring disposed on an outermost ring of the elastic stopping portion. The water-entry cover body, covered on the water-outflow seat body, comprises a centrally-disposed water-entry opening corresponding to the water-conducting opening of the water-barrier sheet body and a lower peripherally-disposed compression ring compressively engaged in between the position-limiting clamping portion and the outer seat circular wall portion of the water-outflow seat body. A water-storage room is disposed in the compression ring of the water-entry cover body. When the water-entry opening of the water-entry cover body is relatively disposed on the water-outflow opening of the faucet or the shower head, the high pressure entry water downwardly presses the water-barrier sheet body to cause the downwardly-moved elastic stopping portion thereof to block the water-inflow openings of the water-outflow seat body, so that the water flow is conducted to the water-outflow opening of the water-outflow seat body through the water-conducting opening of the water-barrier sheet body; moreover, the low pressure entry water is conducted to the water-outflow opening of the water-outflow seat body via one path traveling from the water-conducting opening of the water-barrier sheet body to the water-outflow opening of the water-outflow seat body and the other path traveling along the clearances of the stopping wall portions of the water-outflow seat body, the water-storage circular slot portion, the water-inflow openings of the water-outflow seat body and the water-outflow opening of the water-outflow seat body. Therefore, the outflow water with steady flow rate can be obtained no matter what the high or low pressure entry water is supplied, and also the water-saving effect and the outflow water with steady flow rate can be obtained.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
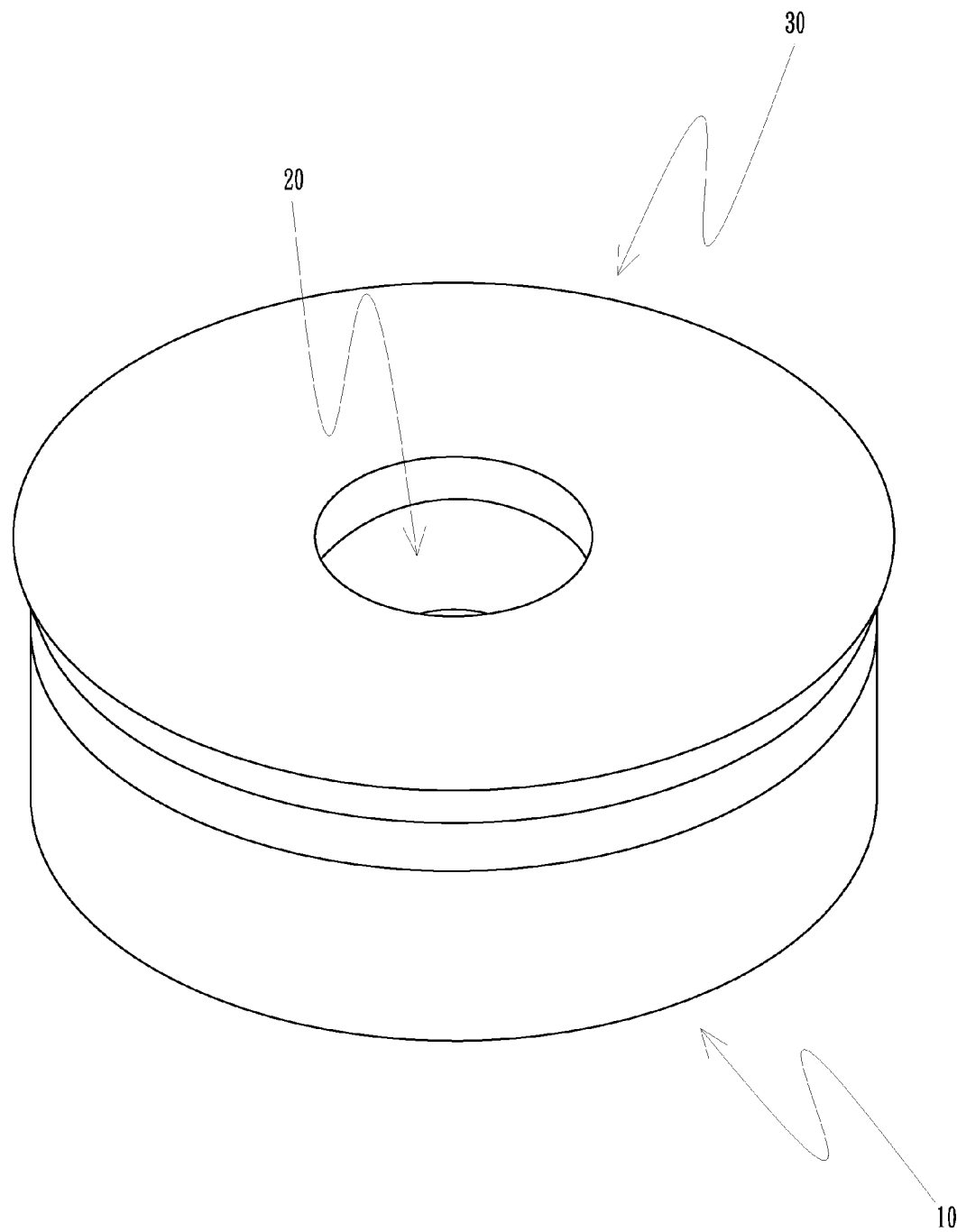
FIG. 1 is a perspective schematic view showing an assembled state of the present invention.
Figure 2:
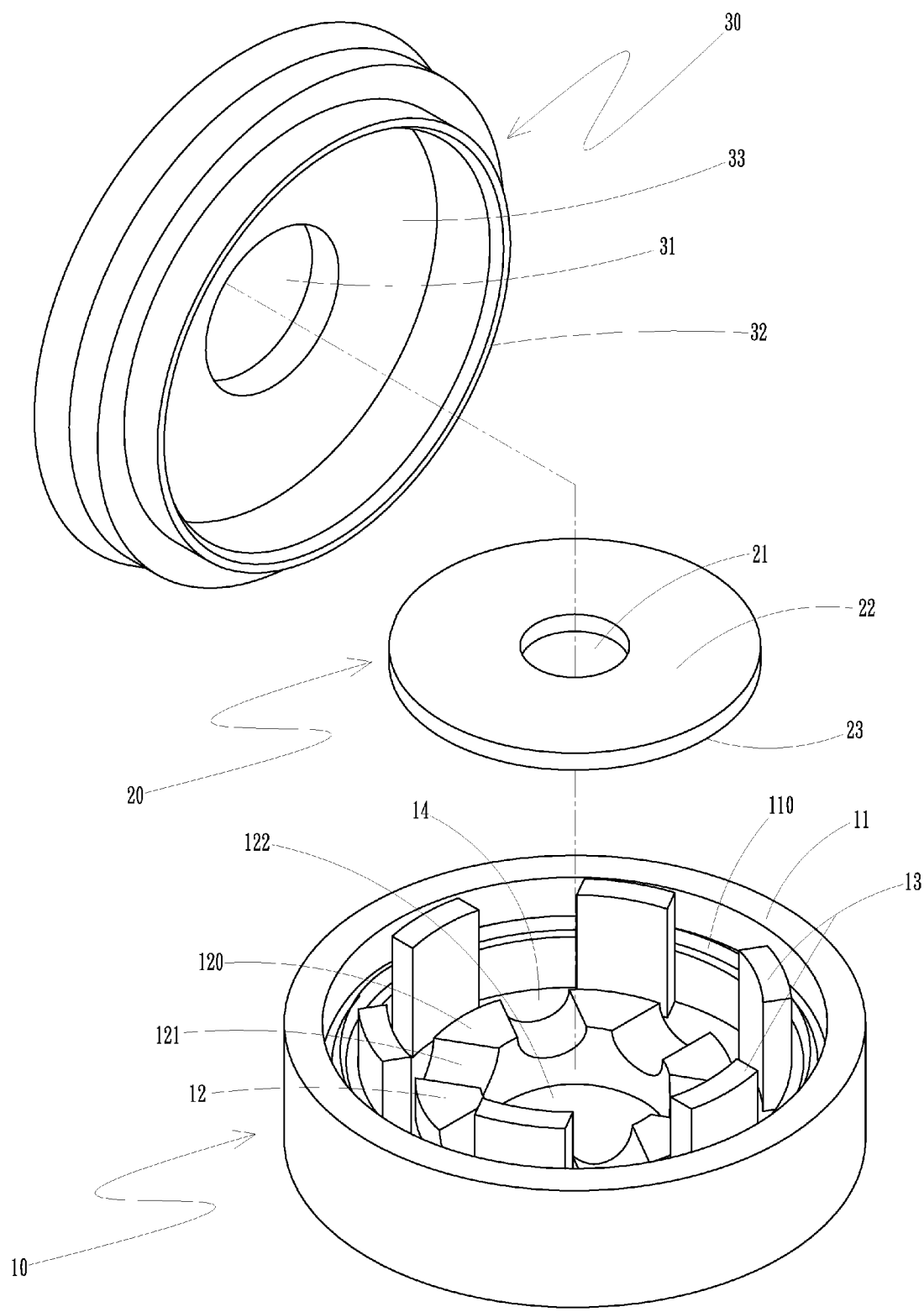
FIG. 2 is a perspective exploded view showing an assembled state of the present invention.
Figure 3:
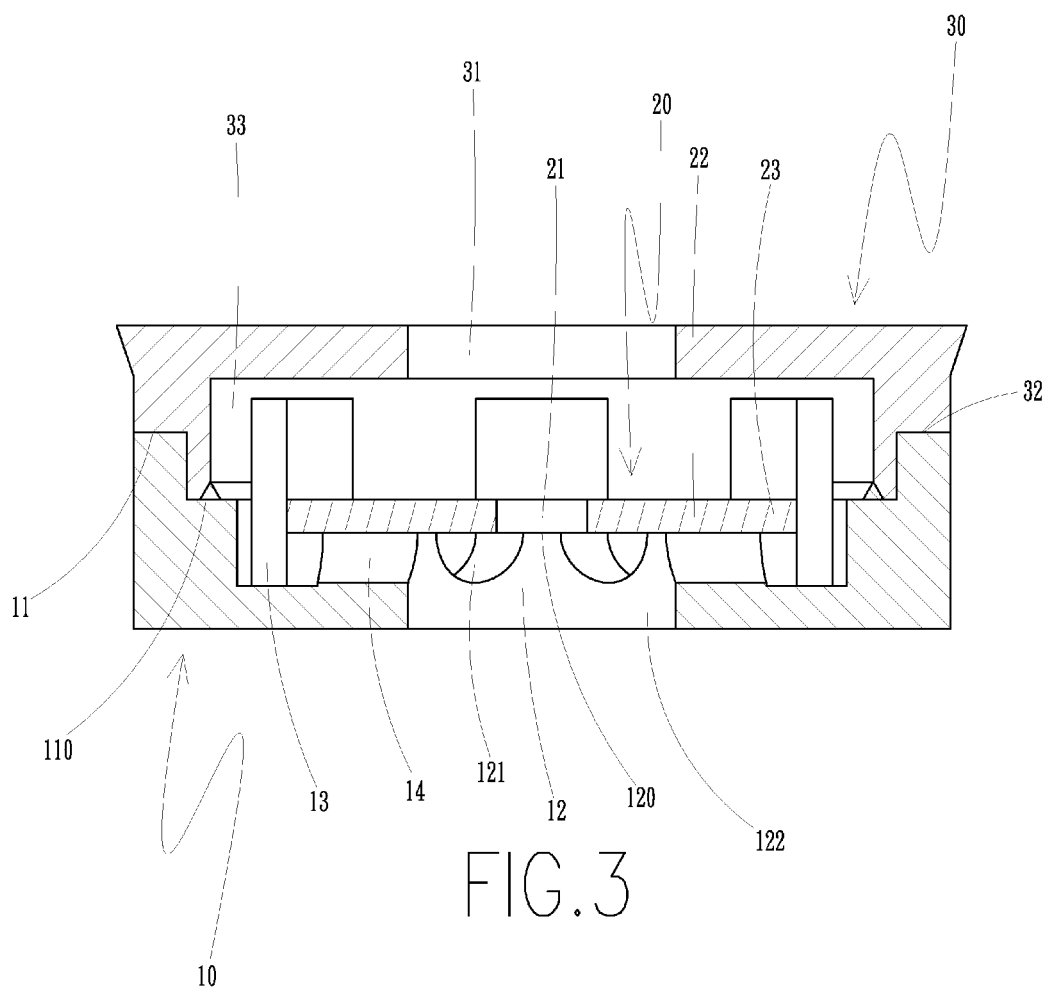
FIG. 3 is a side view showing a cross-sectioned state of the present invention.
Figure 4:
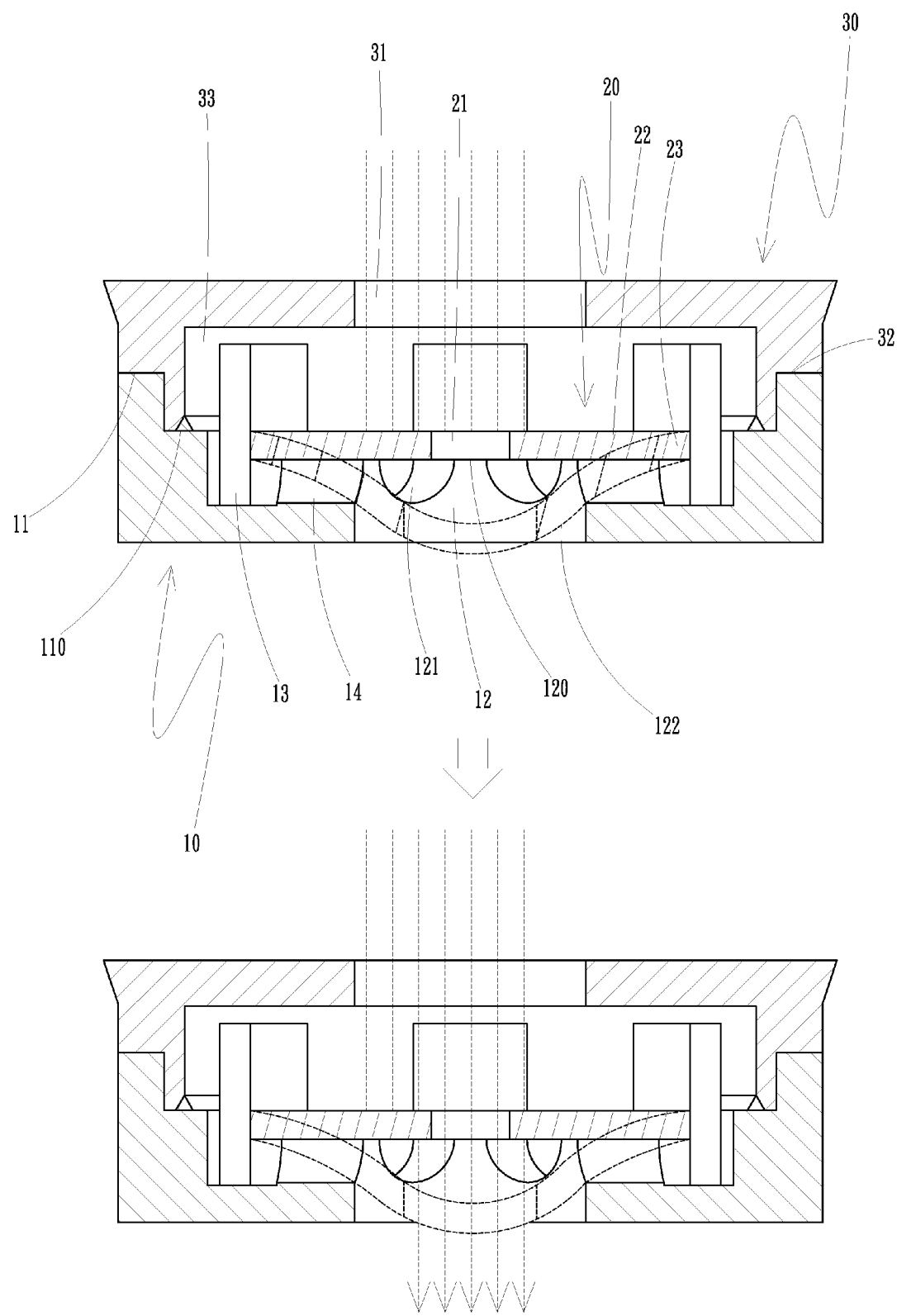
FIG. 4 is a reference view showing an operating state of a water-barrier sheet body of the present invention, wherein the barrier sheet body is acted by a high pressure water.
Figure 5:
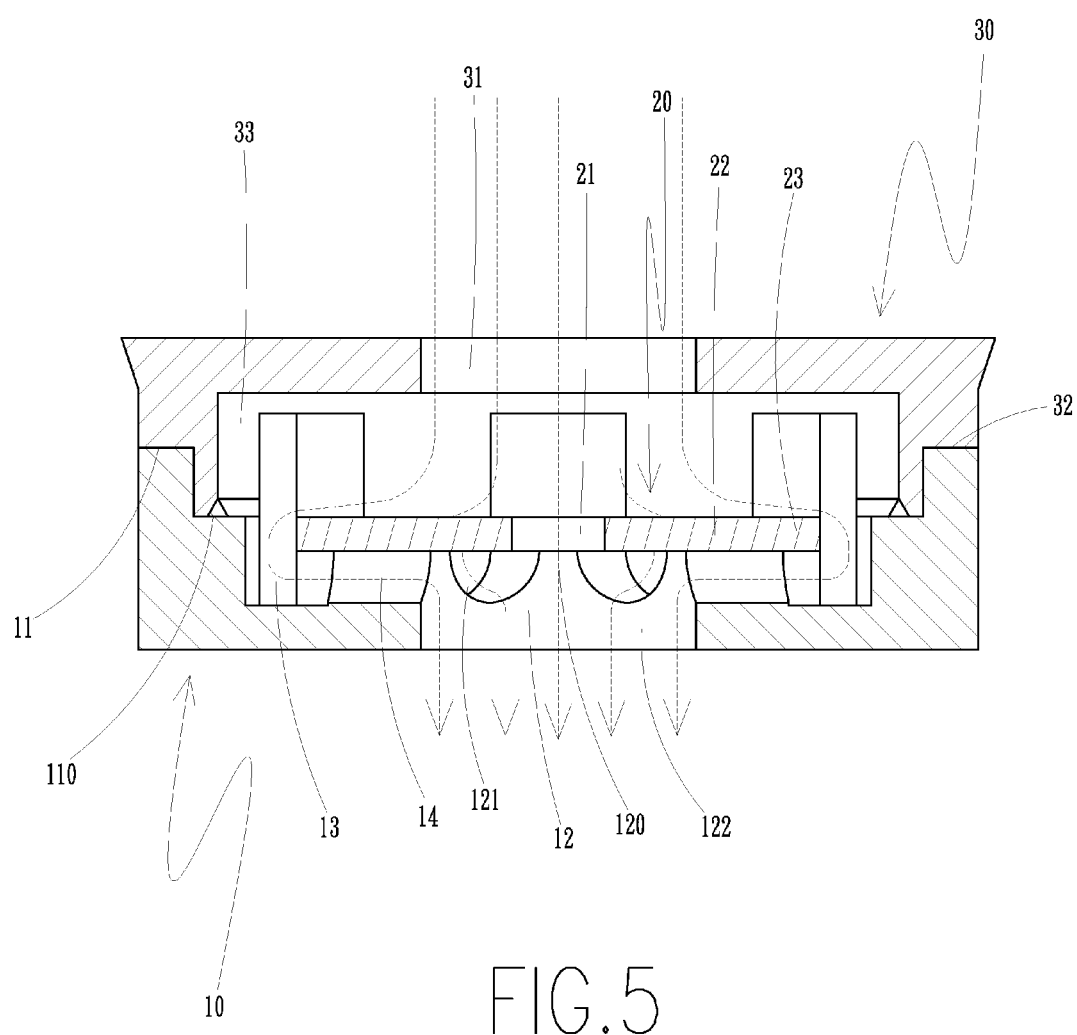
FIG. 5 is a reference view showing an operating state of a water-barrier sheet body of the present invention, wherein the barrier sheet body is acted by a low pressure water.

Referring to FIGS. 1, 2 and 3, FIG. 1 shows a perspective schematic view of an improved water-saving device structure of the present invention, FIG. 2 shows a perspective exploded view of the improved water-saving device structure, and FIG. 3 shows a side view of the improved water-saving device structure. The improved water-saving device structure comprises a water-outflow seat body 10, at least one water-barrier sheet body 20 and a water-entry cover body 30.

The water-outflow seat body 10 comprises an outer seat circular wall portion 11, a water-outflow middle seat portion 12, a plurality of stopping wall portions 13 disposed between the outer seat circular wall portion 11 and the water-outflow middle seat portion 12, a water-storage circular slot portion 14 disposed between the stopping wall portions 13 and the water-outflow middle seat portion 12, a position-limiting clamping portion 110 disposed inside the outer seat circular wall portion 11, a seat top surface 120 disposed on top of the water-outflow middle seat portion 12, a plurality of water-inflow openings 121 recessed on top of the seat top surface 120, and a water-outflow opening 122 centrally penetrated through the water-outflow middle seat portion 12

The water-bather sheet body 20, which is fixedly clamped in between the water-outflow middle seat portion 12 and the stopping wall portions 13 of the water-outflow seat body 10, comprises a centrally-disposed water-conducting opening 21 corresponding to the water-outflow opening 122 of the water-outflow seat body 10, an elastic stopping portion 22 outwardly extended from a peripheral ring of the water-conducting opening 21, and a fixed ring 23 disposed on an outermost ring of the elastic stopping portion 22. In this embodiment, the water-barrier sheet body 20 is a metallic or silicone sheet body.

The water-entry cover body 30, which is covered on the water-outflow seat body 10, comprises a centrally-disposed water-entry opening 31 corresponding to the water-conducting opening 21 of the water-barrier sheet body 20, a lower peripherally-disposed compression ring 32 compressively engaged in between the position-limiting clamping portion 110 and the outer seat circular wall portion 11 of the water-outflow seat body 10, and a water-storage room 33 disposed in the compression ring 32.

With the above-described arrangement of the improved water-saving device structure, the purpose of saving water of the present invention can be achieved.

Figure 6:
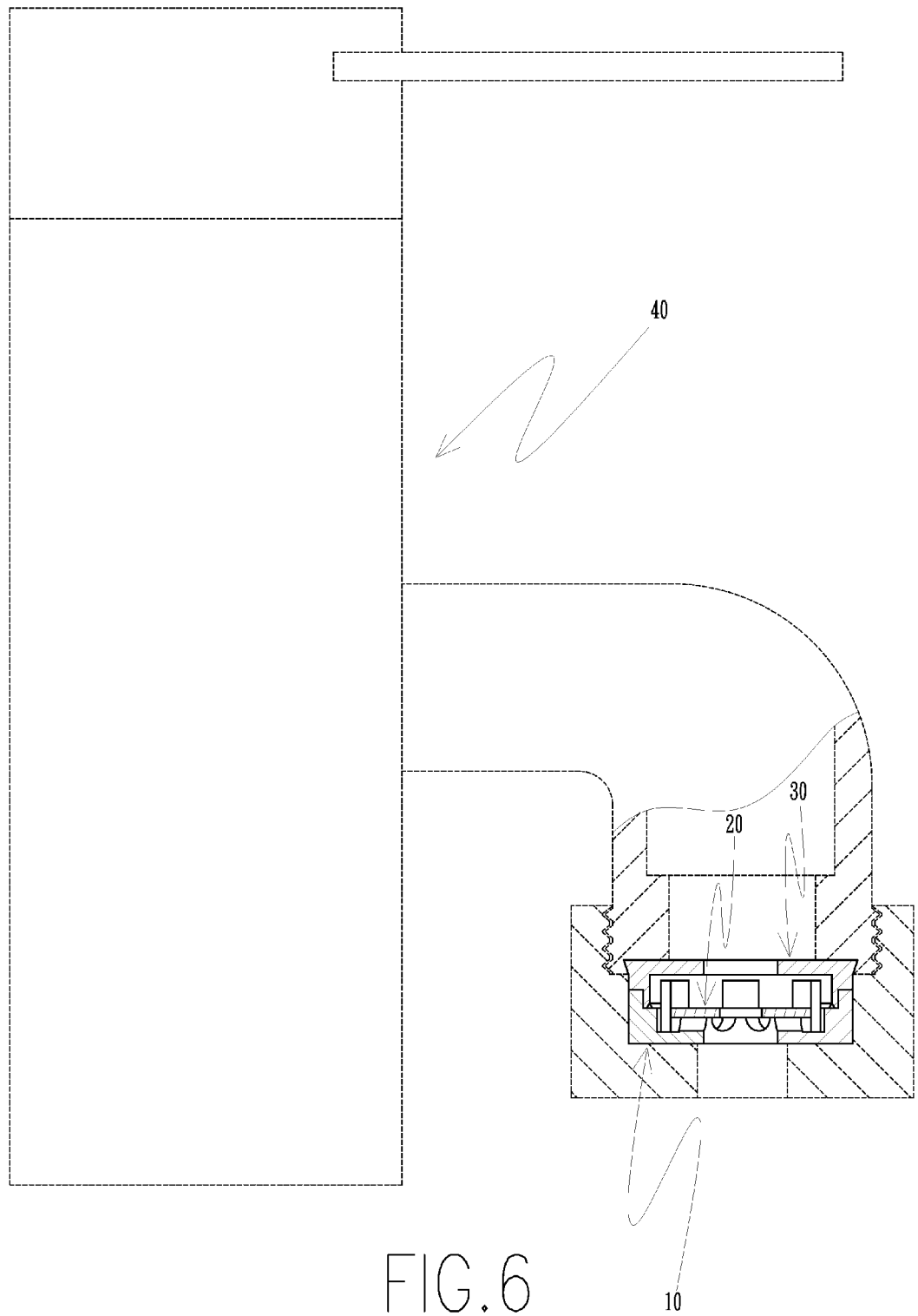
FIG. 6 is a reference view showing a first service state of the present invention incorporated with a faucet.
Figure 7:
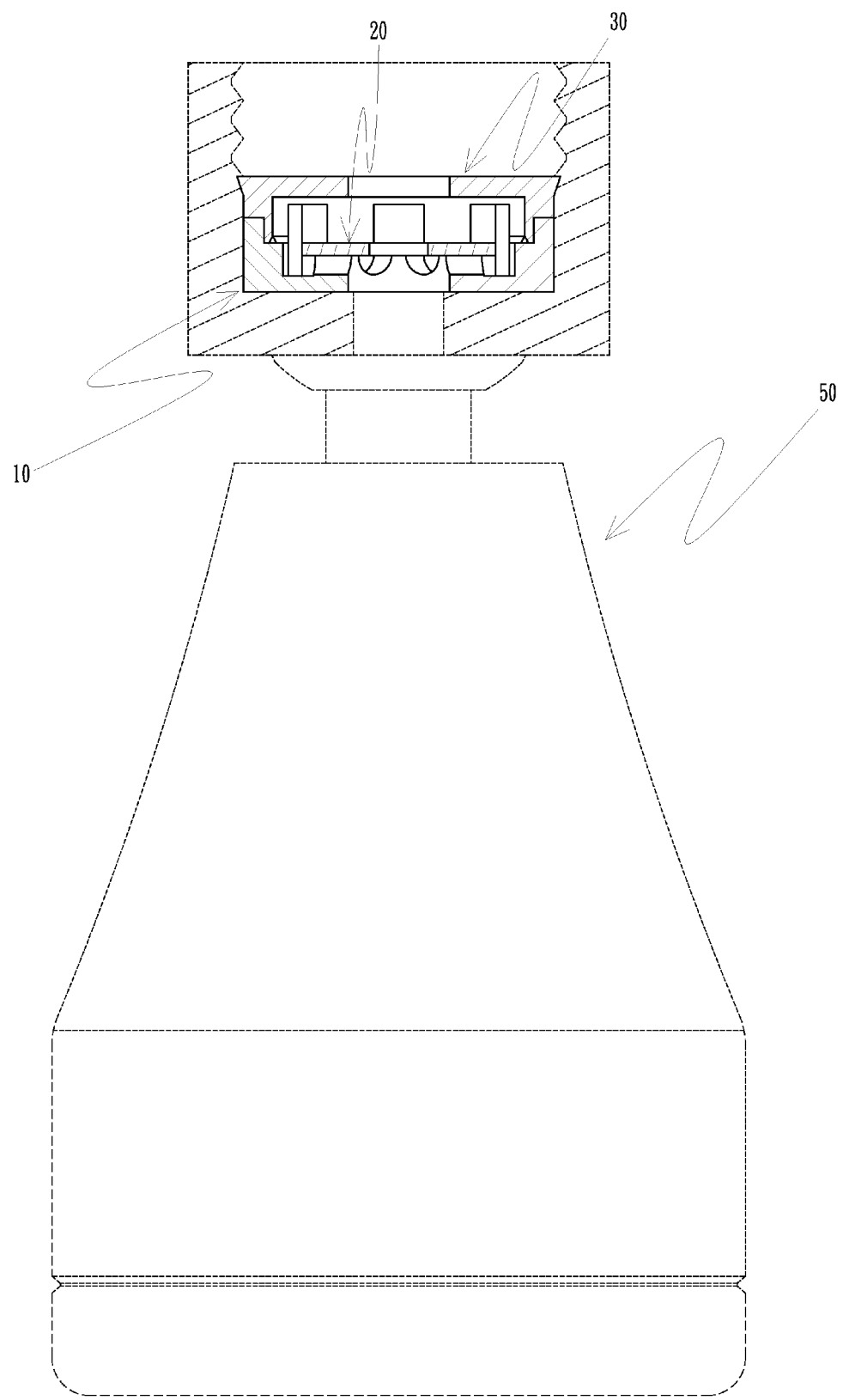
FIG. 7 is a reference view showing a second service state of the present invention incorporated with a shower head.

Referring to FIGS. 4, 5, 6 and 7, FIGS. 5 and 6 are reference views respectively showing operating states of the water-barrier sheet body 20 acted by high and low pressure waters, and FIGS. 6 and 7 are reference views respectively showing service states of the present invention incorporated with a faucet 40 and a shower head 50. The water-barrier sheet body 20 is fixedly clamped in between the water-outflow middle seat portion 12 and the stopping wall portions 13 of the water-outflow seat body 10, and the water-entry cover body 30 is covered on the water-outflow seat body 10. The compression ring 32 of the water-entry cover body 30 is compressively engaged in between the position-limiting clamping portion 110 and the outer seat circular wall portion 11 of the water-outflow seat body 10. The water-entry opening 31 of the water-entry cover body 30 is corresponding to the water-conducting opening 21 of the water-barrier sheet body 20, and the water-conducting opening 21 of the water-barrier sheet body 20 is corresponding to the water-outflow opening 122 of the water-outflow seat body 10. The water-entry opening 31 of the water-entry cover body 30 is corresponding to the water-outflow opening of the faucet 40 or the shower head 50. When the pressure of the entry water is high, the water-barrier sheet body 20 is downwardly pressed by the entry water to cause the downwardly-moved elastic stopping portion 22 thereof to block the water-inflow openings 121 of the water-outflow seat body 10, so that the water flow is conducted to the water-outflow opening 122 of the water-outflow seat body 10 through the water-conducting opening 21 of the water-barrier sheet body 20. When the pressure of the entry water is low, the entry water is conducted to the water-outflow opening 122 of the water-outflow seat body 10 via different paths, in which one is that the water flow travels from the water-conducting opening 21 of the water-bather sheet body 20 to the water-outflow opening 122 of the water-outflow seat body 10 and the other is that the water flow travels along the clearances of the stopping wall portions 13 of the water-outflow seat body 10, the water-storage circular slot portion 14, the water-inflow openings 121 of the water-outflow seat body 10 and the water-outflow opening 122 of the water-outflow seat body 10. Therefore, the outflow water with steady flow rate can be obtained no matter what the high or low pressure entry water is supplied, and also the water-saving effect and the outflow water with steady flow rate can be obtained.

Figure 8:
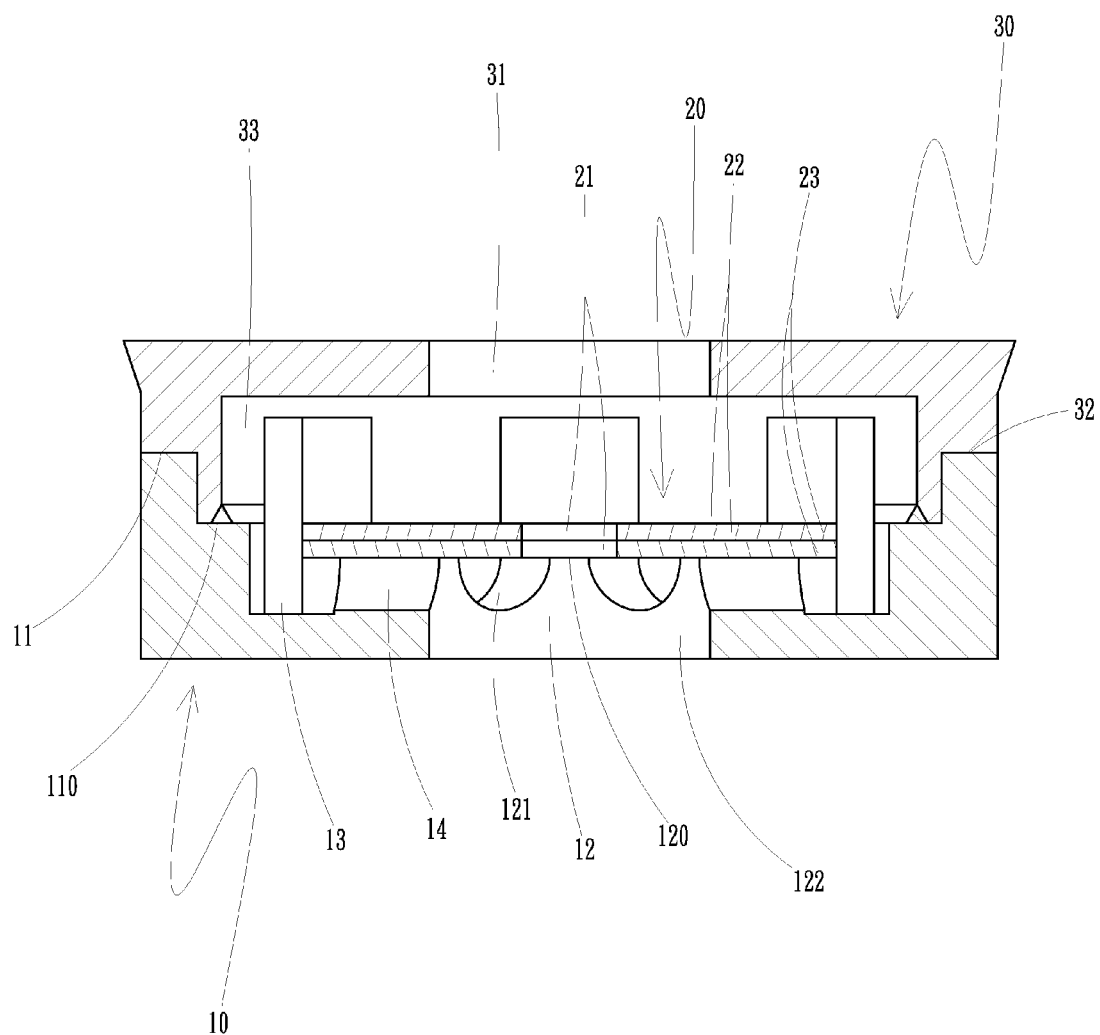
FIG. 8 is a reference view showing two thin laminated water-barrier plate bodies of an embodiment of the present invention.

Referring to FIG. 8, a reference view showing two thin laminated water-barrier plate bodies of an embodiment of an improved water-saving device structure of the present invention is illustrated. In comparison with the above-described embodiment shown in FIGS. 1, 2 and 3, this embodiment in FIG. 8 has two thin laminated water-barrier plate bodies 20, and each of which is centrally disposed with a water-conducting opening 21. With the laminated water-barrier plate bodies 20 to disperse the pressure of the entry water, the outflow water with steady flow rate can be provided, thereby increasing the utilities of the present invention.

In summary, the present invention provides the following advantages. Firstly, the outflow water with steady flow rate can be obtained no matter what the high or low pressure entry water is supplied. That is, when the water-entry opening of the water-entry cover body is relatively disposed on the water-outflow opening of the faucet or the shower head, the high pressure entry water downwardly presses the water-barrier sheet body to cause the downwardly-moved elastic stopping portion thereof to block the water-inflow openings of the water-outflow seat body, so that the water flow is conducted to the water-outflow opening of the water-outflow seat body through the water-conducting opening of the water-barrier sheet body; moreover, the low pressure entry water is conducted to the water-outflow opening of the water-outflow seat body via one path traveling from the water-conducting opening of the water-barrier sheet body to the water-outflow opening of the water-outflow seat body and the other path traveling along the clearances of the stopping wall portions of the water-outflow seat body, the water-storage circular slot portion, the water-inflow openings of the water-outflow seat body and the water-outflow opening of the water-outflow seat body. Secondly, the outflow water with constant flow rate can be obtained no matter what the high or low pressure entry water is supplied, and the waste of the water is decreased by reducing the water pressure variation, thus to obtain water-saving effect.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An improved water-saving device structure, comprising:
a water-outflow seat body comprising an outer seat circular wall portion, a water-outflow middle seat portion, a plurality of stopping wall portions disposed between the outer seat circular wall portion and the water-outflow middle seat portion, a water-storage circular slot portion disposed between the stopping wall portions and the water-outflow middle seat portion, a position-limiting clamping portion disposed inside the outer seat circular wall portion, a seat top surface disposed on top of the water-outflow middle seat portion, a plurality of water-inflow openings recessed on top of the seat top surface, and a water-outflow opening centrally penetrated through the water-outflow middle seat portion;

at least one water-barrier sheet body fixedly clamped in between the water-outflow middle seat portion and the stopping wall portions of the water-outflow seat body, comprising a centrally-disposed water-conducting opening corresponding to the water-outflow opening of the water-outflow seat body, an elastic stopping portion outwardly extended from a peripheral ring of the water-conducting opening, and a fixed ring disposed on an outermost ring of the elastic stopping portion; and a water-entry cover body covered on the water-outflow seat body, comprising a centrally-disposed water-entry opening corresponding to the water-conducting opening of the water-barrier sheet body and a lower peripherally-disposed compression ring compressively engaged in between the position-limiting clamping portion and the outer seat circular wall portion of the water-outflow seat body.

2. The improved water-saving device structure as claimed in claim 1, wherein the elastic stopping portion of the water-barrier sheet body is covered on the seat top surface of the water-outflow middle seat portion of the water-outflow seat body.

3. The improved water-saving device structure as claimed in claim 1, wherein a water-storage room is disposed in the compression ring of the water-entry cover body.

4. The improved water-saving device structure as claimed in claim 1, wherein the water-barrier sheet body comprises a metallic or silicone sheet body.

5. The improved water-saving device structure as claimed in claim 1, wherein two thin laminated water-barrier plate bodies are provided, and each of the water-barrier plate bodies is centrally disposed with the water-conducting opening.

* * * * *